United States Patent [19]

Ishida

[11] Patent Number: 5,158,409
[45] Date of Patent: Oct. 27, 1992

[54] BOLT LOCK DEVICE

[76] Inventor: Eisuke Ishida, 10-2-101, Higashiyamachou, Ashiya-Shi, Hyogo 659, Japan

[21] Appl. No.: 427,137

[22] PCT Filed: Feb. 23, 1989

[86] PCT No.: PCT/JP89/00195
§ 371 Date: Oct. 18, 1989
§ 102(e) Date: Oct. 18, 1989

[87] PCT Pub. No.: WO89/08791
PCT Pub. Date: Sep. 21, 1989

[30] Foreign Application Priority Data

Mar. 7, 1988 [JP] Japan .................. 63-53089
Apr. 5, 1988 [JP] Japan .................. 63-83916
Oct. 10, 1988 [JP] Japan ................. 63-254387
Feb. 3, 1989 [JP] Japan ................... 1-26118

[51] Int. Cl.$^5$ ............... F16B 39/00; F16B 39/24; F16B 19/00
[52] U.S. Cl. .................. 411/107; 411/136; 411/150; 411/273; 411/354; 411/169
[58] Field of Search ............ 411/126, 127, 131, 135, 411/148, 238, 272, 273, 399, 136, 150, 169, 947, 948, 354, 107

[56] References Cited

U.S. PATENT DOCUMENTS

| 836,507 | 11/1906 | Keene | 411/136 |
| 2,412,409 | 12/1946 | Martin | 411/238 |
| 3,189,075 | 6/1965 | Jobe | 411/272 |
| 3,511,289 | 5/1970 | Coyle | 411/354 |
| 4,941,787 | 7/1990 | Shaffer | 411/150 |

FOREIGN PATENT DOCUMENTS

| 2504617 | 10/1982 | France | 411/169 |
| 1593545 | 7/1981 | United Kingdom | 411/169 |

Primary Examiner—Neill R. Wilson
Attorney, Agent, or Firm—Nikaido, Marmelstein, Murray & Oram

[57] ABSTRACT

Means for preventing the common rotation of one of a bolt and a nut in the case where the other of said bolt and said nut is rotated by means of a tool, such as spanner, to screw up a plurality of members by the use of the bolt and the nut is provided.

5 Claims, 5 Drawing Sheets

BOLT LOCK DEVICE

FIELD OF THE INVENTION

The present invention relates to a device having a lock device for preventing rotation.

BACKGROUND OF THE INVENTION

A bolt device, in which a noncircular hole is formed in a member to be bolted and a bolt is provided with an engaging portion for engagement with a corner portion, and the like, of such noncircular hole for presenting rotation, is known.

The method for forming the noncircular hole in the member to be bolted is difficult and punching by means of a press can not be adopted to such method, in many cases.

Generally, a hole, through which a bolt is to be inserted, is opened by means of a drill. However, the hole, which can be drilled, is circular, so that, even though the bolt is provided with an engaging portion formed on the bolt body, the engaging portion does not engage the circular hole and rotation of the bolt is not prevented. Therefore, a nut has had to be threaded to the bolt by rotating the nut while fixing head of bolt by means of a spanner or wrench. This operation has been remarkably dangerous and difficult in an unstable building field, where are one hand can be used, and the like.

DISCLOSURE OF THE INVENTION

The present invention overcome the above described problem of the prior art. Thus, it is an object of the present invention to provide a bolting device capable of preventing rotation of the bolt and which can be used in a circular hole.

In order to achieve the above described object, the first embodiment of the invention provides a bolt device for insertion through a circular hole opened in a member to be bolted to bolt such member from both surfaces of such member by a head of a bolt and a nut, a part of a body of the bolt or a part of a seat surface side of the nut being provided with a convex portion having a height larger than the difference between the radius of the hole and radius of body portion of the bolt but smaller than two times the difference, such convex portion being inserted into a gap between the hole of the member to be bolted and the body of the bolt.

According to a second embodiment of the invention, a washer provided with a convex portion having a height larger than the difference between the radius of the hole and the radius of the body portion of the bolt but smaller than two times the difference is inserted into the gap between the hole of the member to be bolted and the body of the bolt and extends in one axial direction. An engaging portion to be engaged with the bolt or the nut and extending in the other axial direction, is used in combination with a seat surface of the bolt or the nut.

According to a third embodiment of the invention, a first member to bolted having a hole diameter nearly the same as the diameter of the body portion of the bolt is used in combination with such bolt a second member to be bolted, having a hole diameter larger than the hole diameter of the first member to be bolted and a convex portion for insertion into the gap between the hole of the second member to be bolted having the larger hole diameter and the body portion of the bolt in a part of the body portion of such second member.

According to a fourth embodiment of the invention, a bolt provided with a convex portion formed in the bolt part of a body is used in combination with a wedge member disposed in a gap between the body of the bolt and a hole of a member bolted at a position nearly opposite to such convex portion of the bolt.

According to a fifth embodiment of the invention, a washer intergral with a bolt head or having an engaging portion to be engaged with a nut has a convex portion for insertion into a gap between a hole of the member to be bolted and a body of the bolt is employed in combination with a wedge member disposed in the hole of the member to be bolted.

According to a sixth embodiment of the invention, the wedge member in the above described fourth and fifth embodiments of the inventions has a shape acting in both the regular direction of rotation and the opposite direction of rotation of the bolt and may be integrally or separately formed with the bolt.

According to a seventh embodiment of the invention, the body of a bolt, for insertion through the hole of a plurality of members to be bolted and having a circular hole nearly the same diameter as the diameter of the body of the bolt, is provided with, for example, an eccentrically shaped, convex-portioned concentrically shaped, elliptically shaped and deformed circularly shaped, small-diameter portion, depressed from the body of the bolt, and provided with a gap formed for inserting a wedge member through the hole of one member to the bolted, the wedge member being idly put on the small-diameter member.

According to the first embodiment of the invention, because the bolt is engaged with an inside of the hole at two points due to an existence of the convex portion and made eccentric to the hole and because the bolt is rotated within the hole under such eccentric condition, a frictional resistance on a side of a seat surface of the bolt can be increased, in comparison with the conventional one-point contact concentric rotating operation, and common rotation of the bolt and bolted member is prevented.

According to the second embodiment of the invention, the common-rotation preventing effect, equivalent to that in the first embodiment, can be achieved by the combination of the conventional bolt and washer.

According to the third embodiment of the invention, because the member to be bolted, and having the smaller hole, directly prevents the bolt from eccentrically rotating, the common rotation of the bolt can be surely prevented.

According to the fourth embodiment of the invention, the bolt can be fixed in the hole by the wedge member and the convex portion, whereby the common rotation can be surely prevented.

According to the fifth embodiment of the invention, the common-rotation preventing effect, equivalent to that in the fourth embodiment of the invention can be achieved by the use of the conventional bolt.

According to the sixth embodiment of the invention, the common rotation of the bolt can be prevented in both bolting and unbolting.

In the case where two members, having the same diameter are bolted, the centers of holes thereof do not perfectly coinciding, that is in many cases where they are used the centers of the holes thereof are slightly shifting, so that the above described common-rotation preventing effect by a bolt locking device according to the present invention can be still more secured.

According to the seventh embodiment of the invention, the common-rotation preventing effect for the bolt, similar in the first embodiment of its invention, can be achieved in the case where there is hardly the gap between the body of the bolt and the hole of the member to be bolted.

PREFERRED EMBODIMENTS

At first, the common-rotation preventing operation of the bolt in the first embodiment of the invention will be below described.

Figure 2:
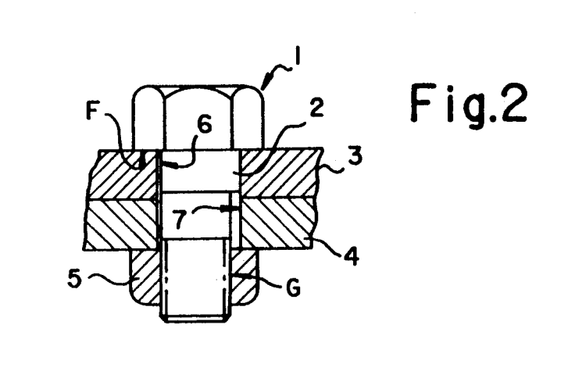
FIG. 2 is a longitudinally sectioned side view of FIG. 1.

The common rotation of the bolt (1) is dependent upon magnitudes of frictional resistance of a seat surface (F) and a screw portion (G) of a nut in FIG. 2.

If the frictional resistance of the seat surface (F) is larger than that of the screw portion (G), the common rotation of the bolt can be prevented.

In general, there is a gap between the bolt and the hole.

It is an object of the first embodiment of the invention to prevent the common rotation by providing a convex portion having a suitable dimension in the above described gap.

Figure 1:
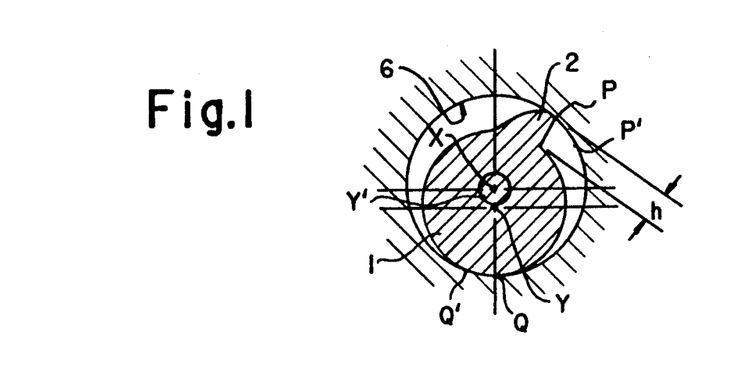
FIG. 1 is a cross-sectioned plan view showing a relation between a bolt and a hole illustrating the principle for preventing the common rotation in the first embodiment of the invention.

Referring now to FIG. 1, a bolt (1) is made eccentric toward one side of a hole (6) due to a convex portion (2). Here, provided that a center of the hole (6) is (X) and a center of the bolt is (Y), the bolt can not be rotated with the point (Y) as a center by suitably selecting a height (h) of the convex portion (2), whereby also the point (Y) moves with the rotation of the bolt.

That is to say, it is preferable that the convex portion, having a height larger than a difference between a radius of a hole opened in a member to be bolted and a radius of a body of the bolt, but smaller than 2 times this difference is formed in a part of the body of the bolt (1). Upon applying a force rotating the bolt (1), by the common rotation under this condition, the convex portion (2) is engaged with an inner wall of the hole (6) not rotated. Upon further applying a force to rotate the bolt (1), the center (Y) of the bolt is moved to (Y'), a point of contact (P) of the convex portion and the inner wall to (P') and a point of contact (Q) of the bolt (1) and the inner wall to (Q') due to the convex portion (2) while sliding. Thus, the center (Y) of the bolt (1) is rotated around the center (X) of the hole (6) with rotating on its own axis.

On the other hand, as shown in FIG. 2, on a seat surface (F) of a head of the bolt (1) the center (Y) of the bolt (1) is moved sideways, so that also the seat surface (F) is not rotated with (Y) as a center but moved sideways. Accordingly, the seat surface (F) of the bolt (1) slides on a larger area, so that the frictional resistance is increased in comparison with the area in the case where the center (Y) is not moved.

In addition, if a nut is strongly tightened, the frictional resistance of the seat surface (F) is increased. Further, frictional resistance between the convex portion (2) and the inner wall of the hole (6) is increased due to seat surface (F) which is difficult to move. Accordingly, no matter how strongly nut (5) may be tightened, the common rotation with bolt (1) does not occur.

It is understood that, as above described, because the frictional resistance preventing the common rotation includes also the frictional resistances of the points P, Q, in addition to the frictional resistance of the seat surface (F) where sliding area has been increased, frictional resistance considerably increased in comparison with that in the case where the conventional bolt is used.

On the other hand, because the frictional resistance in the screw portion (G) is the same as that in the conventional bolt, the frictional resistance on the side preventing common rotation is always relatively larger, the common rotation can be prevented.

The operation in the second embodiment of the invention is same as that in the first embodiment of the invention.

Figure 17:
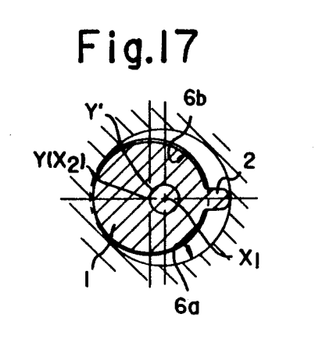
FIG. 17 is a cross sectional side view showing a relation between a bolt and a hole illustrating the principle for preventing common rotation in the third embodiment of the invention.

According to the third embodiment of the invention, as shown in FIG. 17, the bolt (1) is intended to rotate within a larger hole (6a) of member (3) having a center (X1) of the hole (6a) as a center under an eccentrical condition due to the existence of the convex portion (2) on bolt (1) but a member (4) to be bolted provided with a smaller hole (6b) formed therein prevents the above described eccentrical rotation of the bolt (1). That is to say, since the smaller hole (6b) has a diameter nearly same one as that of the body of the bolt (1), a center (X2) of the smaller hole (6b) is almost concentric with the center (Y) of the bolt (1). Accordingly, in order to move the center (Y) of the bolt (1) to (Y') by the eccentrical rotation, the member (4) to be screwed up provided with the smaller hole (6b) formed therein must be slid relatively to the member (3) to be bolted and provided with the larger hole (6a) formed therein. This requires a large force. As a result, the common rotation of the bolt (1) can be prevented. Accordingly, if the height of the convex portion (2) is larger than 2 times a difference between the radius of the smaller hole (6b) and the radius of the body of the bolt by the slightest degree, the common rotation can be prevented.

Figures 18, 19:
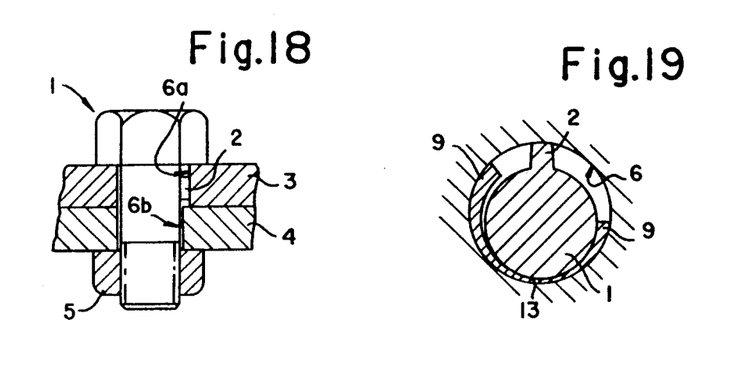
FIG. 18 is a longitudinally sectioned side view of FIG. 17.
FIG. 19 is a cross sectional plan view illustrating the principle for preventing common rotation in the fourth embodiment of the invention.

According to the fourth invention embodiment of the, as shown in FIG. 19, when the bolt (1), provided with the convex portion (2), intends to rotate within the hole (6), a wedge member (9) is wedged into the gap between the body of the bolt (1) and the hole (6) at a position opposite to the convex portion (2) and prevents common rotation of the bolt (1).

In this case, if a length from a point of contact of the convex portion (2) of the bolt (1) and the hole (6) to a point of contact of the wedge member (9) and the hole (6) on a line extending through the center of the bolt (1) is larger than the diameter of the hole (6), the wedge is effected. Accordingly, the height of the convex portion (2) may be smaller than that in the first embodiment of the invention.

The fifth embodiment of the invention is identical with the fourth embodiment in operation for preventing the common rotation of the bolt (1). The former is different from the latter merely in that the usual bolt (1), which is not provided with the convex portion (2), can be used.

According to the sixth embodiment of the invention, the wedge member is adapted to act in both the regular rotation and the opposite rotation of the bolt, whereby not only the common rotation of the bolt when bolting but also that rotated in the loosening or unbolting direction can be prevented.

According to the seventh embodiment of the invention, upon commonly rotating the bolt within the hole of one member to be bolted, a portion having the largest radius of gyration corresponding to the convex portion in a portion having a smaller diameter is rotated toward the increased wall-thickness of the wedge member to press the wedge member against the inner wall of the hole, whereby the wedge is effected to fix the bolt in the hole. Thus, common rotation is prevented.

FIG. 1 is a cross sectional plan view showing a relation of a bolt and a hole aiming at the description of a principle for preventing the common rotation in the first embodiment of the invention and FIG. 2 is a longitudinally sectioned side view of FIG. 1. Referring to FIGS. 1, 2, reference numeral (1) designates a bolt, reference numeral (2) designating a convex portion, reference numerals (3), (4) designating members to be bolted, reference numeral (5) designating a nut, and reference numerals (6), (7) designating circular holes.

A height (h) of the above described convex portion (2) can be optionally selected within a range from a value larger than a difference between a radius (r1) of the holes (6), (7) and a radius (r2) of a body of the bolt (1) to a value smaller than 2 times such difference.

That is to say, $(r1-r2) < h < 2(r1-r2)$.

It is the reason of the above described selection that if the height of the convex portion (2) is smaller than $(r1-r2)$, the convex portion (2) is rotated without being brought into contact with the inner wall of the holes (6), (7) when the center (Y) of the bolt is lain on the center (X) of the hole, whereby the common rotation can not be prevented while if the height of the convex portion (2) is larger than 2 $(r1-r2)$, the bolt (1) can not be inserted into the holes (6), (7).

Figure 3:
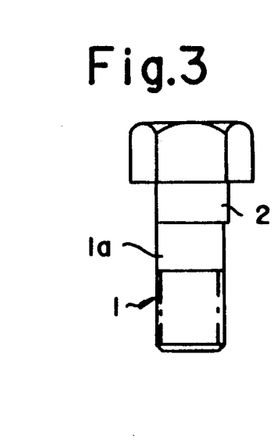
FIGS. 3 to 8 are side views and bottom views showing the bolt according to other preferred embodiments of the first embodiment of the invention.
Figure 4:
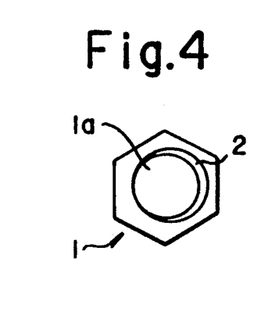

In the preferred embodiments shown in FIGS. 3, 4, an eccentric cam-shaped convex portion (2) is formed in a portion in the vicinity of a head of the bolt of a body (1a) of a bolt (1).

Figure 5:
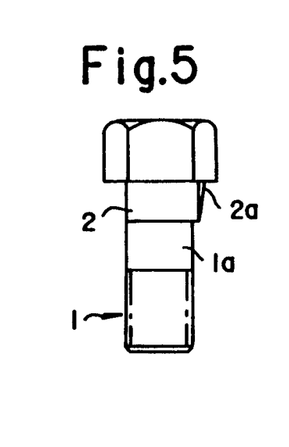
Figure 6:
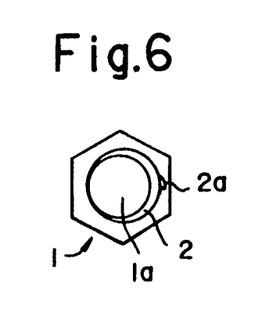

In the preferred embodiments shown in FIGS. 5, 6, a projection (2a), which is inclined toward a pointed end of a bolt (reduced in height), is added to a part in the vicinity of a head portion of a body. This projection (2a) is drawn into a hole with rubbing an inner wall of the hole to gradually increasing a resistance when the bolt (1) is drawn into the hole (6) by means of a nut (5). Accordingly, the bolt is gradually transferred from a first condition that it is lightly fixed in the hole to a condition that it is strongly pressed against the wall surface to gradually increase a frictional resistance at a point of contact of the bolt and the inner wall. Moreover, a seat surface (F) is stuck to a surface of a member (3) to be bolted with a progress of the bolting-up operation. Thus, the frictional resistance is gradually increased to prevent the common rotation of the bolt and the nut. The regulating function is brought about in the combination of the diameter of the hole and the diameter of the bolt, to some extent, in addition to an operation of increasing a resistance for preventing the common rotation by giving inclination to the projection (2) shown in FIGS. 1, 3.

Figure 7:
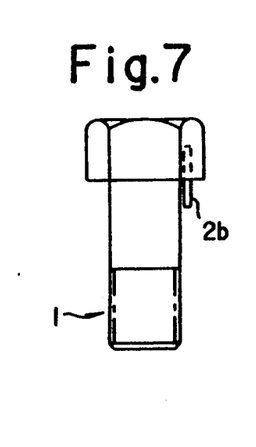
Figure 8:
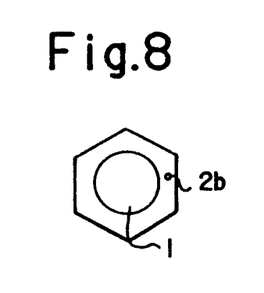

Referring to FIGS. 7, 8, a bolt (1) is opened in a head portion thereof and a pin (2b) is set up in the opening to form a convex portion. It is natural that the convex portion must be housed in an opening formed in a member to be bolted, so that both a height (h) and a length (L) of the convex portion are dependent upon a size of the hole.

In addition, pin (2b) may be tapered in the direction of length like the convex portion (2a) shown in FIG. 5.

Figure 9:
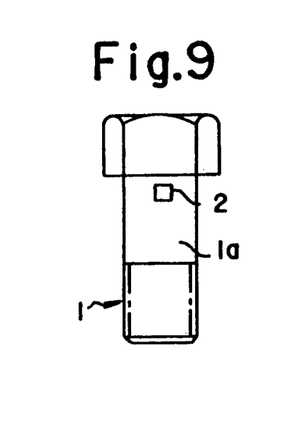
FIG. 9 is a side view showing another preferred embodiment of the bolt according to the first embodiment of the invention.

FIG. 9 shows a preferred embodiment wherein a separate metallic piece is spliced to a part in the vicinity of a head portion of a body (1a) of a bolt (1) by welding, and the like, to form a convex portion (2). In addition, in the case of a plastic bolt or a bolt formed of ceramics, a plastic piece, or a ceramic piece having the same hardness as the bolt, or more, is spliced to the bolt.

Figure 10:
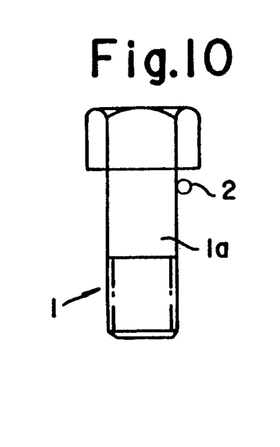
FIGS. 10 to 13 are side views and cross sections showing additionally other preferred embodiments of the bolt according to the first embodiment of the invention.
Figure 11:
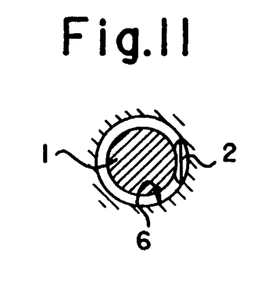

In the preferred embodiments shown in FIGS. 10, 11, a piano wire, which is obliquely cut at both ends, is welded to one side of a body (1a) of a bolt (1) to form a convex portion (2). This convex portion (2) is sharp at both ends in the direction of rotation of the bolt (1), so that the sharp ends are stuck into an inner wall surface of a hole (6), whereby the resistance to the common rotation can be increased.

Figure 12:
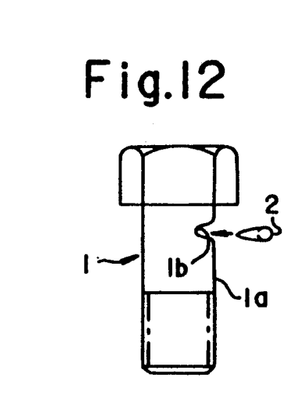
Figures 13, 14:
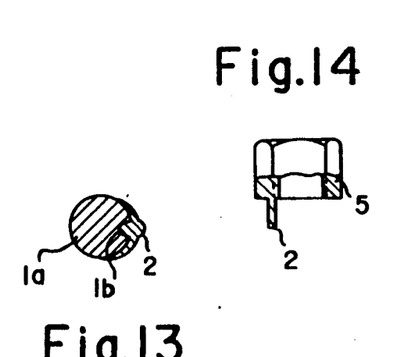
FIG. 14 is a longitudinally sectioned side view showing a nut to which the first invention is applied.

FIGS. 12, 13 show other preferred embodiments wherein a concave portion (1b) is formed in a body portion (1a) of a bolt (1) and a separate metallic piece, and the like, are spliced to this concave portion (1b) to form a convex portion (2).

The convex portion (2) may have various kinds of shape in addition to the above described ones. In addition, in the case where the separate member is spliced to the concave portion of the bolt (1), its material can be optionally selected.

FIG. 14 shows a preferred embodiment wherein a convex portion (2) is formed integrally with a nut (5). In this preferred embodiment a bolt side is rotated to prevent the common rotation of the nut (5).

Figure 15:
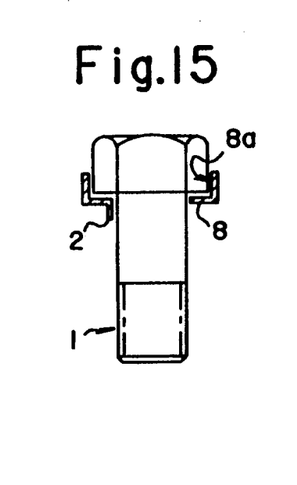
FIGS. 15, 16 are longitudinally sectioned side views showing an example where the second invention is applied to a bolt and to a nut.

Referring to FIG. 15 showing a preferred embodiment of the second embodiment of the invention, a washer (8) is provided with a convex portion (2) extending integrally therewith in one axial direction in a part of a hole thereof and a square hole-shaped engaging portion (8a) bent in the other axial direction formed in an outer circumferential portion thereof. A head of the conventional bolt (1), which is not provided with a convex portion (2), is engaged with the above described engaging portion (8a) to integrally rotate the washer (8) and the bolt (1), whereby achieving the similar common rotation-preventing effect to that in the case where the bolt (1) is provided with the convex portion (2).

Figure 16:
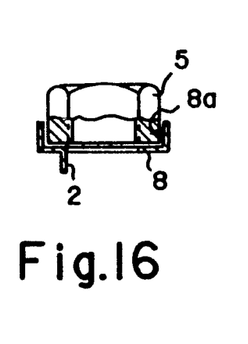

FIG. 16 shows a preferred embodiment wherein the washer (8) shown in FIG. 15 is applied to a nut (5).

FIGS. 17, 18 are a cross sectional plan view and a longitudinally sectioned side view, respectively, showing a relation between a bolt and a hole aiming at the description of a principle for preventing the common rotation in the third embodiment of the invention. Referring to FIGS. 17, 18, one of members (3), (4) to be bolted is provided with a small hole (6b) having a diameter nearly equal to a diameter of a body of a bolt (1) formed therein and the other is provided with a larger hole (6a) formed therein so that a convex portion (2) may be engaged with the larger hole (6a). Since an operation in this case has been already described, it is omitted. In addition, the convex portion (2) may be combined with the washer (8) shown in FIG. 15.

FIG. 19 is a cross sectional plan view showing a relation between a bolt and a hole aiming at the description of a principle for preventing the common rotation in the fourth embodiment of the invention. Referring to FIG. 19, a bolt (1) provided with a convex portion (2) and a wedge member (9) are used in combination. In this case, when the bolt (1) provided with the convex portion (2) intends to rotate within a hole (6), the wedge member (9) is wedged into a gap between a body of the bolt (1) and the hole (6) at a position opposite to the convex portion (2) to prevent the common rotation of the bolt (1).

The above described wedge member (9) is symmetrically formed so as to bite into both the regular rotation and the opposite rotation of the bolt (1).

Figure 20:
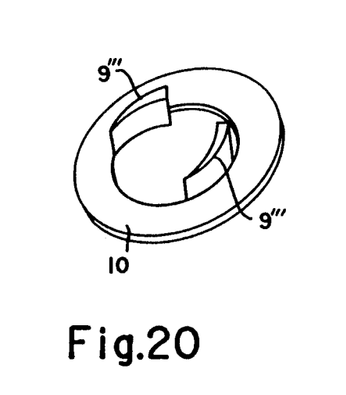
FIGS. 20 to 24 are perspective views showing other preferred embodiments of the wedge member.
Figure 21:
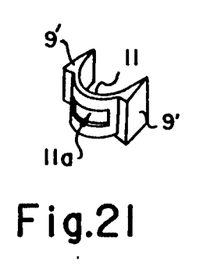
Figure 22:
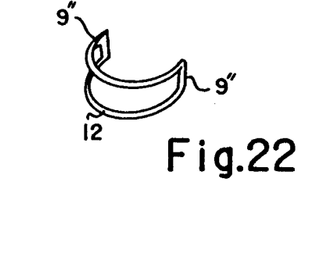
Figure 23:
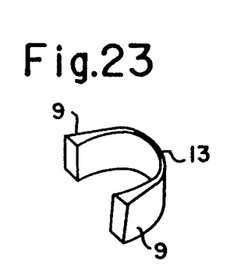
Figure 24:
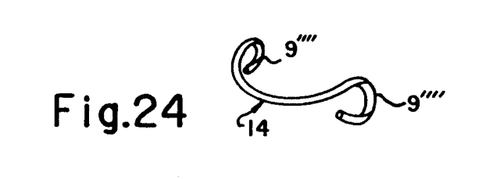

Various kinds of preferred embodiment of the wedge member (9) are shown in FIGS. 20 to 24, in which FIG. 20 shows the case where the wedge member (9''') is formed in a washer (10), FIG. 21 showing the case where the wedge members (9'), (9') are formed at both ends of a belt-shaped metallic plate (11) provided with a window (11a) formed therein and elastically held by the bore inner wall, FIG. 22 showing the case where the similar configuration wedge member 9'' is formed of a metallic wire (12) such as a wire, FIG. 23 showing the case where in order to connect both wedge members (9), (9) to each other on a side opposite to the convex portion (2), they are connected to each other by means of a plate-like bridge member (13) having a reduced wall-thickness on pointed end sides where the wall-thickness of the wedge members (9), (9) is reduced, and FIG. 24 showing the case where a metallic wire (14) is bent at both ends thereof and rolled so that the pointed end sides thereof may be reduced in wall-thickness to form the wedge members (9''''), (9'''')

Figure 25:
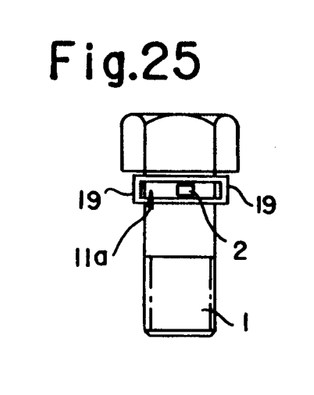
FIG. 25 is a side view of the bolt showing one example for supporting the wedge member on the bolt.

A length of the member for connecting the wedge members shown in FIGS. 21 to 24 to each other is selected at ½ times a peripheral length of the body of the bolt (1) or more and the member is bent in an arched shape so as to be idly engaged with the body of the bolt (1). In this case, if the convex portion (2) of the bolt (1) is slightly separated from the head, as shown in FIG. 25, the connecting member can be supported between the convex portion (2) and the head and the window (11a) can be inserted into the convex portion (2) to support the connecting member. In addition, a flange for engaging the wedge members (19), (19) with a peripheral edge of a hole (6) to support them may be bent. In this case, it is desired that a separate washer provided with a hole having a diameter slightly larger than an outside diameter of the flange or washer (10) and having a thickness larger than that of the flange or washer (10) is used together similarly to the washer (10) shown in FIG. 20 to make the wedge members (19), (19) independent of the movement of the bolt.

Figure 26:
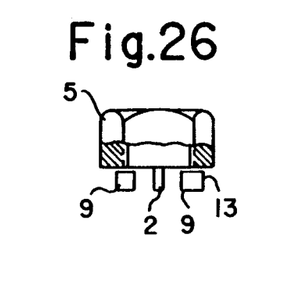
FIG. 26 is a longitudinally sectioned side view showing the combination of the wedge member and the nut.
Figure 27:
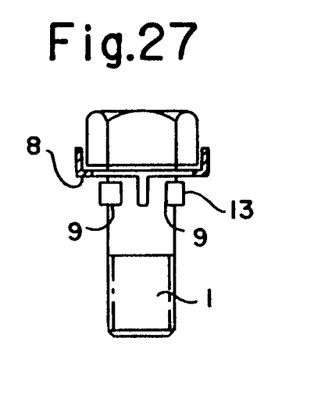
FIG. 27 is a longitudinally sectioned side view showing the combination of the wedge, a washer with a convex portion and the conventional bolt.
Figure 28:
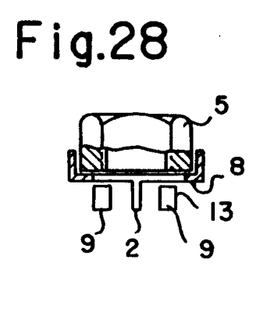
FIG. 28 is a longitudinally sectioned side view showing the combination of the wedge member, the washer with a convex portion and the conventional nut.

FIG. 26 shows the case where the wedge members (9), (9) shown in FIG. 23 are used in combination with the nut (5) shown in FIG. 14, FIG. 27 showing the case where the washer (8) shown in FIG. 15 and the wedge members (9), (9) shown in FIG. 23 are used in combination with the conventional bolt (1), and FIG. 28 showing the case where the washer (8) shown in FIG. 15 and the wedge members (9), (9) shown in FIG. 23 are used in combination with the nut (5).

The above described wedge members (9), (9) may have a diameter larger than that of the hole (6) to be self-sustained in the hole (6) by an elastic action.

In addition, the above described wedge members (9), (9) can be formed as separate members to bite into the bolt (1) from both directions of the regular rotation and the opposite rotation of the bolt (1), whereby fixing in the hole (6). Since the wedge members (9), (9) of this type can position and fix the bolt (1) in the hole (6), they can be used also in means for positioning and fixing a zero point of a knob in an assembly process of a variable resistor in acoustic instruments and the like.

The above described wedge members (9), (9) can be formed of plastics, ceramics and other suitable materials without limiting to metallic materials.

Figure 29:
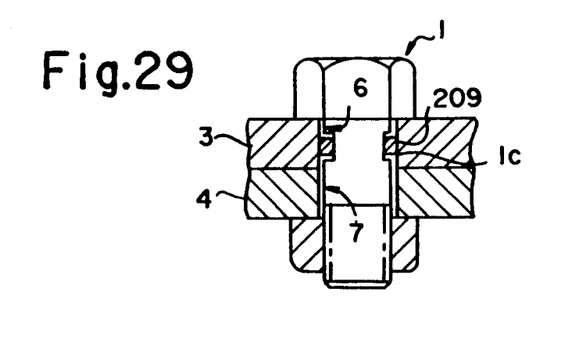
FIG. 29 is a longitudinally sectioned side view showing a preferred embodiment of the seventh embodiment of the invention.

FIG. 29 shows a preferred embodiment of the seventh embodiment of the invention wherein holes (6), (7) of members (3), (4) to be bolted have a diameter almost same one as a diameter of a body of a bolt (1). In this case, if a convex portion (2) is formed in the bolt (1), the bolt (1) can not be inserted into the holes (6), (7), so that a dented small-diameter portion (1c) is formed to be used in combination with a wedge member (209).

Figure 30:
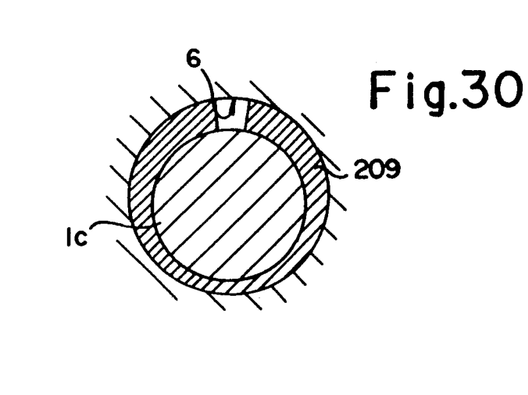
FIGS. 30 to 33 are cross sectional views showing principal parts in separate preferred embodiments of the seventh embodiment of the invention.
Figure 31:
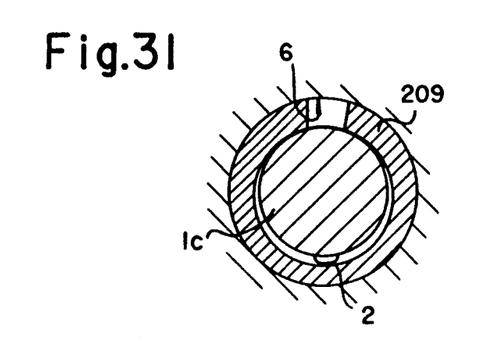
Figure 32:
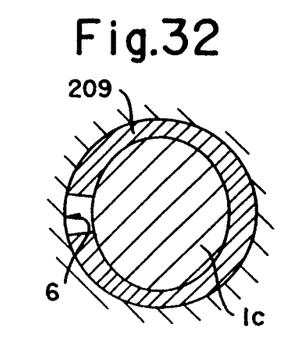
Figure 33:
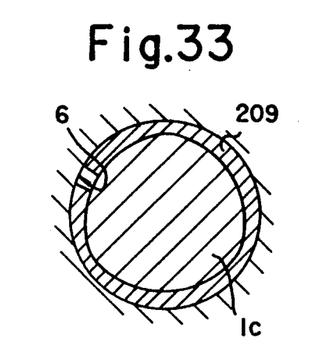

The above described small-diameter portion (1c) is formed in the bolt (1) in an eccentric circular shape, as shown in FIG. 30, in a convex portioned (2) concentric circular shape, as shown in FIG. 31, in an elliptic shape, as shown in FIG. 32, and in a deformed circular shape, as shown in FIG. 33. The wedge member (209) is formed in the form of a split ring. In the cases shown in FIGS. 30, 31, an inner circle is eccentric relatively to an outer circle. In the case shown in FIG. 32, an inner circle is elliptic relatively to an outer circle. In the case shown in FIG. 33, an inner circle is deformed relatively to an outer circle.

With the above described construction, if the bolt (1) is commonly rotated within the hole (6), a portion having the largest radius of rotation of the small-diameter portion (1c) is rotated toward the wedge member (209), of which wall-thickness is increased, to press the wedge member in the hole, whereby the wedge is effected to fix the bolt (1) in the hole (6), and thus the common rotation is prevented.

In the case shown in FIG. 32, the wedges are effected at 2 places. In the case shown in FIG. 33, the wedges are effected at 3 places.

Figure 34:
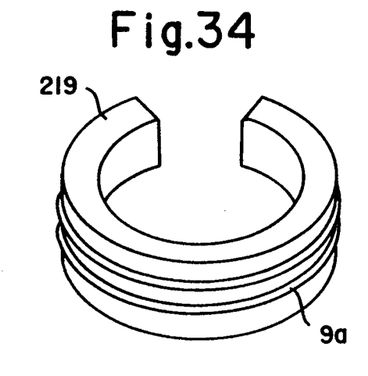
FIGS. 34 and 35 are perspective views showing other preferred embodiments of the wedge member.
Figure 35:
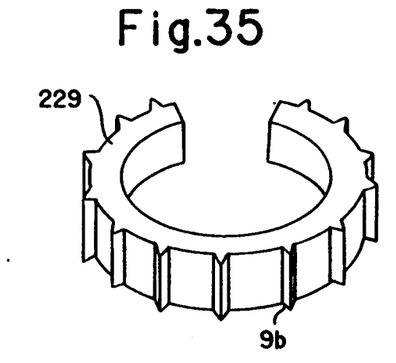

The wedge member (209) shown in FIGS. 30 to 33 is adapted to be pressed in the hole (6) by an elastic expansion force and provided with a plurality of V-shaped circular projections (9a) as shown in FIG. 34 on an outer circumferential surface to make the removal of the bolt (1) from the hole (6) difficult or V-shaped projections (9b) parallel to a direction of an axis shaft line as shown in FIG. 35 formed at suitable intervals in a circumferential direction, whereby securing the prevention of common rotation. And, it is desired that the outer circumferential surface of these wedge members (209,219,229) is subjected to the beveling to make round, whereby making their insertion into the hole (6) easy.

Figure 36:
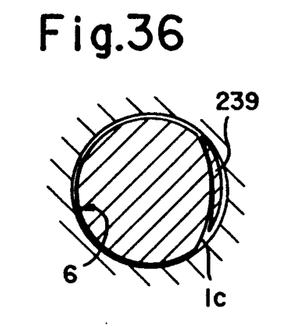
FIG. 36 is a cross sectional plan view showing principal parts in further another preferred embodiment of the seventh embodiment of the invention.

In addition, the similar common-rotation preventing effect can be achieved also by forming the small-diameter portion (1c) of the bolt (1) as a segmental circle, which is one of modifications of a deformed circle, as shown in FIG. 36, in section and idly putting a crescent-shaped wedge member (239) in the small-diameter portion (1c) of the bolt (1).

If the small-diameter portion (1c) of the bolt (1) is formed on a boundary of the bolt head and the body portion, the wedge members (239) can be integrated with the washer. In addition, the small-diameter portion (1c) may be formed at other positions, that is it may be formed corresponding to for example the hole (7) of the member (4) to be bolted on the side of the nut.

What is claimed is:

1. A bolting device for insertion through a circular hole extending through each member to be bolted to each other from opposite surfaces of said members, each circular hole of each member having a same diameter, said bolting device comprising:
   a bolt head;
   a bolt body;
   a nut; and
   a convex portion extending along said bolt body, said convex portion making said bolt body eccentric toward one side of said circular hole when said bolt body is inserted in said circular hole, said convex portion having a height larger than a difference between said radius of said circular hole and a radius of said bolt body passing through said circular hole but smaller than two times said difference wherein said convex portion preventing said bolt body from rotating with said nut after a) said bolt head and said nut contact respective opposite surfaces of said members, b) said convex portion contacts an inside surface of said circular hole and c) a point on said bolt body contacts said inside surface of said circular hole to bolt said members to each other.

2. A bolting device for insertion through a circular hole extending through members to be bolted to each other from opposite surfaces of said members, said bolting device comprising:
   a bolt head, a bolt body and a nut; and
   a washer having
      a convex portion for insertion into a gap between said circular hole and said bolt body, said convex portion making said bolt body eccentric toward one side of said circular hole when said bolt body is inserted in said circular hole, and
      an engaging portion for engagement a) at one surface with one of said bolt head and said nut and b) at an opposite surface with one of said opposite surfaces of said members adjacent said one of said bolt head and said nut, said engaging portion extending in one axial direction, said convex portion extending in an axial direction opposite to said extension of said engaging portion in combination with a seat surface on the one of said bolt head and said nut, wherein said convex portion preventing said bolt body from rotating with said nut after a) said bolt head and said nut contact respective opposite surfaces of said members, b) said convex portion contacts an inside surface of said circular hole and c) a point on said bolt body contacts said inside surface of said circular hole to bolt said members to each other.

3. A bolting device for insertion through a circular hole extending through members to be bolted to each other from opposite surfaces of said members, said bolting device comprising:
   a bolt head, a bolt body and a nut, said bolt body having a convex portion protruding therefrom, said convex portion making said bolt body eccentric toward one side of said circular hole when said bolt body is inserted in said circular hole; and
   a wedge member wedged into a gap between said bolt body and said circular hole, wherein said wedge member and convex portion preventing said bolt body from rotating with said nut after a) said bolt head and said nut contact respective opposite surfaces of said members, b) said convex portion contacts an inside surface of said circular hole, c) a point on said bolt body contacts an inside surface of said wedge member and d) another point on said bolt body contacts one of 1) said inside surface of said circular hole and 2) said inside surface of said wedge member to bolt said members to each other.

4. A bolting device for insertion through a circular hole extending through members to be bolted to each other from opposite surfaces of said members, said bolting device comprising:
   a bolt head, a bolt body and a nut;
   a washer integrally formed with
      an engaging portion to be engaged with one of said bolt head and said nut, and
      a convex portion for insertion into a gap between said circular hole and said bolt body, said convex portion making said bolt body eccentric toward one side of said circular hole when said bolt body is inserted in said circular hole; and
   a wedge member wedged into said circular hole, said washer and said wedge member preventing said bolt body from rotating with said nut after a) said bolt head and said nut contact respective opposite surfaces of said members, b) said convex portion contacts an inside surface of said circular hole, c) a point on said bolt body contacts an inside surface of said wedge member and d) another point on said bolt body contacts one of 1) said inside surface of said circular hole and 2) said inside surface of said wedge member to bolt said members to each other.

5. A bolting device as set forth in claim 3 or claim 4, wherein said wedge member includes wedging means acting in both directions of rotation of said bolt.

* * * * *